Patented Feb. 7, 1928.

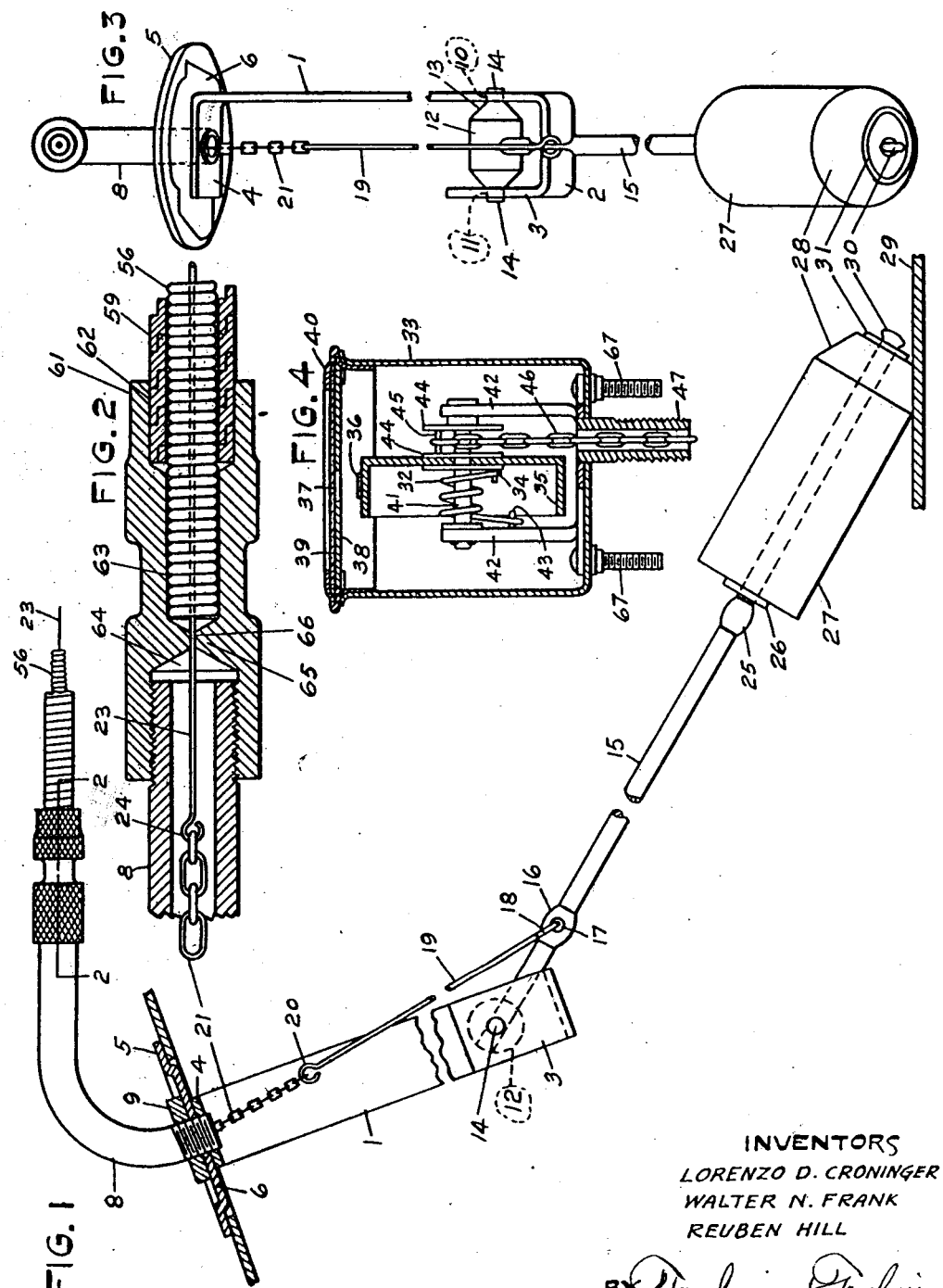

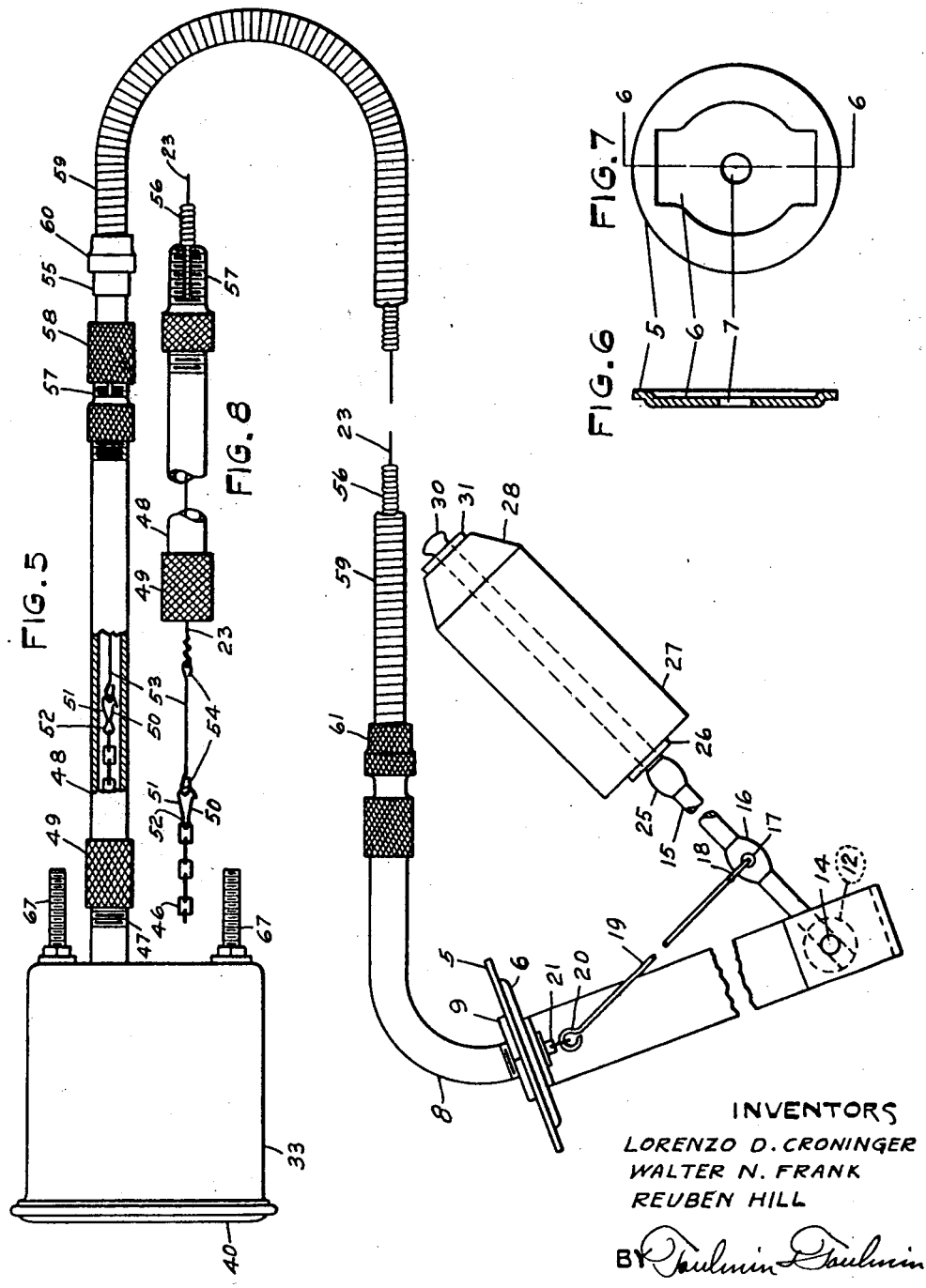

1,658,235

UNITED STATES PATENT OFFICE.

WALTER N. FRANK AND LORENZO D. CRONINGER, OF DAYTON, OHIO, AND REUBEN HILL, OF WEST HARTFORD, CONNECTICUT, ASSIGNORS TO THE GROLAN MANUFACTURING COMPANY, OF DAYTON, OHIO, A CORPORATION OF DELAWARE.

LIQUID-LEVEL GAUGE.

Application filed July 10, 1925. Serial No. 42,745.

Our invention relates to liquid level gauges, and in particular to a gasoline gauge for indicating the quantity or level of gasoline in tanks in automobiles and remote from an indicator.

It is the object of our invention to provide a liquid level gauge for use with a liquid tank unit on an automobile and which may be applied to a tank of an existing automobile by utilization of the standard opening in the tank designed to receive a liquid gauge on the tank, thus providing by this simple arrangement a remote indicating gauge which will indicate on the dashboard of a vehicle.

It is a further object to provide a gauge in which the communicating means is always under tension being pulled in one direction by a spring or its equivalent in the indicator head, and in the other direction by the float and float arm.

It is a further object to provide in a gauge of this type an arrangement by which movements in one direction of the float may take place without pushing or otherwise disturbing the communicating means which is taken up to meet each new position of the float by the spring in the indicator head.

It is a further object of our invention to provide a novel form of pivotal support for the float arm and a novel form of float which will always rest upon the bottom of the tank in a predetermined position so as to insure accurate registeration when the float arm is in that position.

It is a further object to provide a float arm with a connecting link and a loose flexible connection between the link and the wire communicating means so that when the float arm and link are suddenly thrust upwardly ahead of the movement of the communicating wire the wire will not be disturbed and the float and its links may move freely without injuring the wire or actuating it as in the upward movement of the float the wire is moved by the spring in the indicator head.

It is a further object to provide a so-called tank unit which will be self-positioning so that the unit will be positioned in the tank in a predetermined position so that it will not interfere with or be interfered by the customary baffle plates in the tank.

It is a further object of this gauge to provide a float-carrying member that may be thrust through the opening of the tank then positioned in the tank automatically and fastened therein.

It is a further object to provide a means for keeping the wire in a straight line in its limited movement back and forth at the tank end.

It is a further object of our invention to provide a ready means of connecting by a stiff link the forward end of the wire to the chain of the indicator drum.

Referring to the drawings:

Figure 1 is a side elevation of the tank unit with the supporting and positioning plate in section;

Figure 2 is a section taken longitudinally on the line 2—2 of Figure 1 showing the mechanism to prevent the escape of the gas and method of connection with the enclosing cables.

Figure 3 is an end elevation showing the tank unit and the method of pivotally supporting the float arm;

Figure 4 is a section through the indicator head illustrating the relatively heavy spring adapted to pull the communicating wire in one direction;

Figure 5 is a side elevation partially in section of the complete unit broken away at its intermediate portion to shorten the entire length of the cable and wire;

Figure 6 is a section on the line 6—6 of Figure 7;

Figure 7 is a top plan view of the positioning and supporting plate; and

Figure 8 is a detail view showing the method of connection of the forward link to the indicator chain.

Referring to the drawings in detail, 1 is the depending supporting arm of a supporting bracket of the tank unit which bracket is provided with a lower U-shaped portion consisting of a transverse portion 2 and an upwardly extending portion 3 which extends upwardly a short distance parallel to the depending member 1. The upper end 4 of the member 1 is turned at right angles and is attached by spot welding or other suitable means to the supporting and positioning plate 5 which consists of an embossed portion 6 for positioning the tank unit in the tank in a predetermined position. Through the center of this plate member 4 and the plate 5 is an aperture 7 through which passes the tube 8 which is threaded therein and held in position by a nut 9.

The lower end of this U-shaped bracket has apertures 10 and 11 which carry the transverse bearing member 12 which has tapering positioning shoulders 13 and laterally extending bearing members 14 projecting through the openings 10 and 11. This bearing member is a drum-like affair with conical ends. Located at right angles to its major axis and centrally thereof in the drum-like portion 12 is the float arm 15. This float arm is provided with a flattened portion 16 having an eye 17 for the reception of the loop 18 of the relatively stiff wire link 19 which is connected at its upper end by the loop 20 to the chain 21 which in turn is connected to the wire 23 at 24.

Returning to the float arm 15, it will be noted that a second enlarged portion 25 is provided which limits the movement of a washer 26 which in turn limits the movement of a cork float member 27 which is a cylinder having an interior longitudinal aperture for receiving the end of the float arm 15. The lower end of the float is bevelled as at 28 so that its bevelled face will lie on the floor of the tank 29. This insures registration accurately each time the float returns to zero position. Otherwise the turning of the float, if pivoted, might result in the float keeping the float arm in an abnormal position when the registration should be zero. The end of the float arm is enlarged as at 30 which acts as an abutment for the washers 31 which limit the end movement in that direction of the float 27. This float is free to turn, if desired, about its longitudinal axis which is the axis of the float arm 15 but the float cannot move laterally on the float arm.

There is no guiding tube for the member 19 and the chain passes through a relatively large tube 8 so that there can be no binding. If the float arm is suddenly moved upwardly by a sudden surge of gasoline it can move freely without disturbing the wire 23 which is thereafter pulled into position to bring the communicating means taut by the heavy spring 32 in the indicator head 33. This heavy spring is connected at one end at 34 to the drum 35 on which is carried the indicating scale 36. This scale is seen through the opening 37 of the dial plate 38 under the glass 39 which is held in position by the bezel 40. The drum is mounted on a shaft 41 journalled in the arms 42 carried by the indicator cup 33. The other end of the spring 32 is connected to a pin 43 carried on one of the arms 42. On this shaft 41 is mounted a pair of spaced disks 44 between which is a pin 45 to which one end of a chain 46 is connected. The chain passes through an externally threaded member 47. It is to this member that the sliding guide tube 48 is connected by the internally threaded sleeve 49.

One of the features of our invention occurs at this point. Heretofore it has been necessary to connect the fine wire directly to the chain 46. This necessitated rather delicate operations by the assembly man in the cramped position behind the dashboard of the automobile. These gauges are applied usually on production lines where cars are passing before the installation mechanic at a high rate of speed allowing very little time to get the gauge installed. This has resulted in broken gauges and improper installation.

By the form of our invention we provide a snap hook 50 with a movable tongue 51, said hook connected by the eye 52 to the chain 46. A stiff link 53 is provided with eyes 54 with one of which the snap hook can be quickly hooked by the operator, thus eliminating these difficulties. The other end of the link 53 is connected by the other eye 54 to the wire 23. This link and small portions of the wire indicated are outside of the tube 48 when the tube is pushed back in its rearmost position which is limited by the stop 55 mounted on the internal guiding tube 56. As soon as the connection is made this tube 48 is moved forwardly and then the tube is clamped into position on the guide tube 56 by the externally threaded split collar 57 and internally threaded clamping collar 58. A protecting tube 59 is also provided which is held in position on the internal tubing by the clamping member 60.

The rear end of this protecting tube 59 is carried in an internal chamber member 61. This member has a relatively large chamber portion 62 for receiving the member 59, a smaller chamber portion 63 for receiving the end of the flexible guide tube 56, and a third spaced enlarged chamber 64 which is separated from the second chamber 63 by an annular wall 65 through which is drilled a fine hole 66 just large enough to pass the wire 23. This prevents the gasoline from surging into the tube and passing out of the tank. This internally threaded aperture 64 receives the forward threaded end of the curved tube 8. It will be noted that the wire is pulled in its limited movement back and forth on a straight line substantially so as not to bend the wire.

The tank is usually provided with an aperture of a configuration which will fit the embossed portion 6 of the supporting plate 5 so that the unit will be positioned in the right direction.

The indicator head is attached through the bolts 67 and the usual clamp which does not form a part of this invention.

It will be understood that we desire to comprehend within our invention such modifications as may be necessary to adapt it to varying conditions and uses.

The invention having been set forth, what is claimed is:—

1. In a liquid level gauge, an indicator, a tank unit consisting of a support, float arm and float adapted to be projected through an opening in the tank, means on the tank unit for positioning it in the tank, and communicating means connecting said float arm to said indicator, means on the indicator to pull the communicating means in one direction, while the float pulls it in the other direction, and means consisting of a number of connected members between the float arm and the communicating means to permit the float arm to move in one direction freely but at the same time without being disconnected from the float arm.

2. In a liquid level gauge, a float arm and float, means to support said float arm and float in the tank, a remote indicator, communicating means connected at its one end to the indicator, means to guide said communicating means, means in the indicator to pull the communicating means in one direction while the float pulls it in the other direction, and linked means connecting the float arm and the other end of the communicating means said means being adapted to allow the float arm to move in one direction without disturbing the communicating means.

3. In a liquid level gauge, an indicator, a float arm and float, means to support said float arm and float in the tank, communicating means connected at one end to said indicator, means to guide said communicating means, means in the indicator to pull the communicating means in one direction while the float pulls it in the other direction, means connecting the float arm and the other end of the communicating means adapted to allow the float arm to move in one direction without disturbing the communicating means, said means consisting of a relatively stiff link connected to the float arm at one end and to a flexible member at the other end, said flexible member being connected at one end to the link and at the other end to the communicating means.

4. In a liquid level gauge, a suspending bracket having a U-shaped lower end, a transverse member journalled therein having means thereon to prevent lateral movement of the member, a float arm mounted in said member and having a float thereon, a communicating means having a connection with said float arm, a supporting plate having a connection with said bracket and adapted to support the bracket in a tank, guiding means for the communicating means, and an indicator having a connection with the communicating means.

5. In a liquid level gauge, a suspending bracket having a U-shaped lower end, a transverse member journalled therein having means thereon to prevent lateral movement the member, a float arm mounted in said member, a float thereon, a communicating means having a connection with said float arm, a supporting plate having a connection with said bracket and adapted to support the bracket in a tank, guiding means connected therewith for guiding the communicating means, an indicator, and means in the indicator for pulling the communicating means in one direction, said connecting means including means connected to the float arm to permit it to move in one direction without disturbing the remainder of the communicating means even though connected to it.

6. In a liquid level gauge, a suspending bracket having a U-shaped lower end, a transverse member journalled therein having means thereon to prevent lateral movement of the member, a float arm mounted in said member, a float thereon, a communicating means having a connection with said float arm, a supporting plate having a connection with said bracket and adapted to support it in a tank, guiding means connected with said plate for guiding the communicating means, an indicator, and means in the indicator for pulling the communicating means in one direction, said connecting means including means connected to the float arm to permit it to move in one direction without disturbing the remainder of the communicating means, said means connected to the float arm consisting of a link and chain connected respectively to the float arm and the said remainder of the communicating means and connected to each other.

7. In a liquid level gauge, a depending supporting bracket having a U-shaped lower end, a drumlike member with tapering ends and projecting bearing members on either end journalled in the arms of the lower end of the bracket, a float arm carried in said member, a float thereon consisting of a cylindrical member with a tapered end, the float having its major axis coinciding with the axis of the float arm, a stiff link connected to the arm, a chain connected to said link, a relatively large guiding tube enclosing a portion of said chain and supported on the upper end of said bracket, a positioning and supporting plate associated with said protecting tube, a communicating wire connected at one end to said chain, means connected to said tube, to guide and protect said wire, an indicator at the other end of said wire and protecting means, and a relatively strong yielding member in said indicator for pulling said wire in one direction, the movement of said float in one direction moving said wire in one direction, the movement of the float in the other direction not disturbing the wire.

8. In a liquid level gauge, a depending supporting bracket having a lower U-shaped end, a drumlike member with tapering ends and projecting bearing members on either end journalled in the arms of the lower end of the bracket, a float arm carried in said member, a float thereon, the float having its major axis coinciding with the axis of the float arm, a stiff link connected to the arm, a chain connected to said link, a relatively large guiding tube enclosing a portion of said chain and supported on the upper end of said bracket, a positioning and supporting plate associated with said protecting tube, a communicating wire connected at one end to said chain, an indicator at the other end of said wire, and a relatively strong yielding member in said indicator for pulling said wire in one direction, the movement of said float in the other direction moving said wire, the movement of the float in the reverse direction not disturbing the wire.

9. In a liquid level gauge, a depending supporting bracket having a lower U-shaped end, a drumlike member with tapering ends and projecting bearing members on either end journalled in the arms of the bracket, a float arm carried in said member, a float thereon consisting of a cylindrical member with a tapered end, the float having its major axis coinciding with the axis of the float arm, a stiff link connected to the arm, a flexible member connected to said link, a relatively large guiding tube enclosing a portion of said chain and supported on the upper end of said bracket, a positioning and supporting plate associated with said protecting tube, a communicating wire connected to said chain, an indicator at the other end of said wire and protecting means, a relatively strong yielding member in said indicator for pulling said wire in one direction, the movement of said float in the other direction moving said wire, the movement of the float in the reverse direction not disturbing the wire, and means to prevent gasoline from leaking through the relatively large tube at the tank end, consisting of a member engaging the protecting means at one end and the relatively large tube at the other and having a barrier therebetween having an aperture large enough only for the passage of the wire as it reciprocates back and forth.

10. In a liquid level gauge, a depending bracket, a float arm journalled therein, a cylindrical float having its major axis coinciding with the major axis of the float arm and mounted on the arm, a supporting plate for supporting said bracket, positioning shoulders on said plate for positioning the bracket in the tank, a tubular member carried by said bracket and said plate and extending upwardly and away from the bracket, said member being relatively large and stiff, a yielding guiding and protecting means connected therewith, a link connected at one end to said float arm, a chain connected at one end to the other end of said link at a point outside of the tube, a communicating wire connected to the other end of said chain at the upward and forward end of the tube, said wire passing through said guiding means, an indicator at the free end of said means, and a yielding member in the indicator for pulling the wire in one direction.

11. In a liquid level gauge, a depending bracket, a float arm journalled therein, a cylindrical float having its major axis coinciding with the major axis of the float arm and mounted on the arm, a supporting plate for supporting said bracket, positioning shoulders on said plate for positioning the bracket in the tank, a tubular member carried by said bracket and said plate and extending upwardly and away from the bracket, said member being relatively large and stiff, a yielding guiding and protecting means connected therewith, a link connected to said float arm, a chain connected to said link at a point outside of the tube, a communicating wire connected to said chain at the upward and forward end of the tube, said wire passing through said guiding means an indicator at the free end of said means, and a yielding member in the indicator for pulling the wire in one direction, and a link of relatively stiff material adapted to connect a chain on the indicator to said communicating wire, a chain on the indicator, and a snap hook adapted to connect said chain and said link last mentioned.

12. In a liquid level gauge, a communicating wire, a depending bracket, a float arm pivoted thereon, and a float carried by said arm, a relatively large stiff guide tube connected to said bracket, a chain member adapted to reciprocate therein and connected at one end to the communicating wire and at the other end to a link, the link connected to said chain member at one end outside of said tube and at the other end to said float arm, said chain member being adapted to buckle when the link and float arm move in one direction ahead of the movement of the wire, an indicator head, an indicator in said head connected to said wire, and yielding means in said indicator head to keep said chain member, communicating wire and link taut and under tension.

13. In a liquid level gauge, a tank unit, an indicator, said tank unit having a float and float arm, said float having its major axis coinciding with the major axis of the float arm, a communicating means having as parts thereof a wire and chains connected respectively to opposite ends of said wire, one of said chains being connected to said indicator and a link for connecting the other chain to said float arm, the indicator having yielding means adapted to actuate said communicating means in one direction, the movement of the float adapted to actuate said communicating means in the other direction.

In testimony whereof, we affix our signatures.

WALTER N. FRANK.
LORENZO D. CRONINGER.
REUBEN HILL.